(12) United States Patent
Head (10) Patent No.: US 12,455,721 B2
(45) Date of Patent: Oct. 28, 2025

(54) SYSTEMS AND METHODS FOR DETERMINING DATE PROXIMITY IN FEATURES ENGINEERING

(71) Applicant: Kinaxis Inc., Ottawa (CA)

(72) Inventor: Mark Head, Kemptville (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 18/891,634

(22) Filed: Sep. 20, 2024

(65) Prior Publication Data

US 2025/0103573 A1   Mar. 27, 2025

Related U.S. Application Data

(60) Provisional application No. 63/604,246, filed on Nov. 30, 2023, provisional application No. 63/584,644, filed on Sep. 22, 2023.

(51) Int. Cl.
| | | |
|---|---|---|
| *G06F 7/00* | (2006.01) | |
| *G06F 7/02* | (2006.01) | |
| *G06F 16/22* | (2019.01) | |

(52) U.S. Cl.
CPC ............ *G06F 7/02* (2013.01); *G06F 16/2237* (2019.01)

(58) Field of Classification Search
None
See application file for complete search history.

(56) References Cited

U.S. PATENT DOCUMENTS 10,009,391 B1 * 6/2018 Smith ................... H04L 67/02
2024/0134357 A1 * 4/2024 Rud .................. G05B 19/0423

* cited by examiner

*Primary Examiner* — Tuankhanh D Phan
(74) *Attorney, Agent, or Firm* — Ruggiero McAllister & McMahon LLC (57) ABSTRACT

Methods and systems that improve upon the speed of engineering features related to date differences. Such methods and systems comprise one or more data structures that can use epoch dates to establish an index in the data structure, and integer differences as values in the data structure. The data structures can then be used as a lookup for a date of interest, to efficiently determine the number days since a previous target date and the number of days until a next target date.

12 Claims, 7 Drawing Sheets

SYSTEMS AND METHODS FOR DETERMINING DATE PROXIMITY IN FEATURES ENGINEERING

The present application claims the benefit of U.S. Ser. No. 63/584,644, filed Sep. 22, 2023, and U.S. Ser. No. 63/604,246, filed Nov. 30, 2023, each of which is expressly incorporated by reference in its respective entirety herein.

BACKGROUND

Feature engineering, the process by which data is enriched prior to most machine learning applications, can be costly. Each engineered feature imposes additional cost (in terms of time and resources) and any steps that minimize processing time and computer resources are valuable.

One feature used in feature engineering is the calculation of the differences between different dates. This can be used to determine the number of days remaining until a holiday, a sports event, a quarterly earnings release, or any other target date. From this data (that is, differences between dates), a user can determine the number of days until the next defined event.

The method by which this is usually accomplished is to calculate the difference between a date of interest and the list of target dates, in terms of days. This gives a range of values in terms of days: the difference (or value) is greater than 0 when the target date is in the future from the date of interest. On the other hand, the difference (or value) is less than 0 when the target date is in the past from the date of intertest. For example, if a date of interest is Dec. 22, 2019, and the target date is Dec. 25, 2019, then the difference (in number of days) is +3, since the target date is 3 days ahead, or in the future, of Dec. 22, 2019. On the other hand, if the date of interest is Dec. 28, 2019, and the target date is Dec. 25, 2019, the difference (in number of days) is -3, since the target date is before Dec. 25, 2019.

For values which are greater than 0, the smallest such value is the number of days (from a date of interest) until the next closest event (or target date). And for the values which are less than 0, the largest such value is the number of days (of the date of interest) since the most recent event.

In the conventional approach, a data set contains a large list of target dates and dates of interest. Each target date is subtracted from each date of interest from a list of dates. This results in the formation of a D×H matrix of integer values, where D is the number of dates of interest in the dataset, H is the number of target dates to check, and the integer values are the number of days difference between each combination of interest date and target date. Subsequently, the matrix is looped over twice, row by row, to select the closest values. For each row, the values are checked to find the minimum and maximum. As described above, for values which are greater than 0, the minimum value is the number of days (from a date of interest) until the next closest event (or target date); for the values which are less than 0, the maximum value is the number of days (of the date of interest) since the most recent event. The two lists of maximal and minimal values are returned as the enriched features for use in a machine learning problem.

In arriving at the two lists, a large number of computer operations must be performed, including the calculation of differences between two dates, in a given dataset, which often include hundreds of thousands, if not millions, of data points. In addition, a large amount of storage must be allocated for the intermediate matrix of integer values described above. It would be advantageous to reduce both the processing time and the storage allocation, thereby improving computer operations, in the engineering of features for machine learning.

BRIEF SUMMARY

Disclosed herein are methods and systems that improve upon the speed of engineering features related to date differences. Such methods and systems comprise one or more data structures that can use epoch dates to establish an index in the data structure, and integer differences as values in the data structure. The data structures can then be used as a lookup for a date of interest, to efficiently determine the number days since a previous target date and the number of days until a next target date, without calculating the actual difference in days between the date of interest and a particular target date. Furthermore, such data structures are simple one-dimensional arrays, rather than large matrices. Often, only two data structures are produced. Such systems and methods greatly reduce the amount of computing resources and processing time.

This approach converts the epoch of the date of interest to an index of the data structure; the corresponding value the data structure provides the feature in question. This approach removes all duplicate calculation, the finding of minimum and maximum values, and prevents the need for unnecessary hashing. This approach is orders of magnitude faster than the conventional approach, which reduces the computation cost in obtaining these features.

In one aspect, a computing apparatus includes a processor. The computing apparatus also includes a memory storing instructions that, when executed by the processor, configure the apparatus to receive, by the processor, a first list of one or more dates of interest and a second list of one or more target dates. The computing apparatus also includes a memory storing instructions that, when executed by the processor, configure the apparatus to transform, by the processor, each date of interest and each target date to a corresponding integer normalized date. The computing apparatus also includes a memory storing instructions that, when executed by the processor, configure the apparatus to obtain, by the processor, a maximum normalized date. The computing apparatus also includes a memory storing instructions that, when executed by the processor, configure the apparatus to initialize, by the processor, a first array of length equal to 'L', where 'L' is the maximum normalized date incremented by 1. The computing apparatus also includes a memory storing instructions that, when executed by the processor, configure the apparatus to initialize, by the processor, a second array of length equal to 'L', where 'L' is the maximum normalized date incremented by 1. The computing apparatus also includes a memory storing instructions that, when executed by the processor, configure the apparatus to, in the first array: populate, by the processor, each normalized target date in the first array with a sentinel value; obtain, by the processor, a minimum normalized target date; starting at the minimum normalized target date: populate, by the processor, each entry of the first array with a value of days since a previous target; and retrieve, by the processor, a third array from the first array, the third array including one or more entries indicating days since a previous target date. The computing apparatus also includes a memory storing instructions that, when executed by the processor, configure the apparatus to, in the second array: populate, by the processor, each normalized target date in the second array with the sentinel value; obtain, by the processor, a maximum normalized target date; starting at the maximum normalized target date: populate, by the processor, each entry of the second array with a value of days until a next target; and retrieve, by the processor, a fourth array from the second array, the fourth array including one or more entries indicating days until a next target date.

When populating each entry of the first array, the computing apparatus may be configured to: set, by the processor, a current value of days since equal to zero; beginning at an index of the first array equal to the minimum normalized target date: set, by the processor, the sentinel value equal to the current value of days since; a) increase, by the processor, the current value of days since by one; b) proceed, by the processor, to a next entry in the first array by increasing the index by one; c) set, by the processor: the next entry equal to the current value of days since, when the entry is a null value; and the next entry equal to zero and the current value of days since equal to zero, where the entry is a sentinel; and iterate, by the processor, steps (a)-(c) until the first array is exhausted.

When populating each entry of the second array, the computing apparatus may be configured to: set, by the processor, a current value of days until equal to zero; beginning at an index of the second array equal to the maximum normalized target date: set, by the processor, the sentinel value equal to the current value of days until; set, by the processor, the sentinel value equal to zero; a) increase, by the processor, the current value of days since by one; b) proceed, by the processor, to a next entry in the second array by decreasing the index by one; c) set, by the processor: the next entry equal to the current value of days until, when the entry is a null value; and the next entry equal to the current value of days until and the current value of days until equal to zero, where the entry is a sentinel; and iterate, by the processor, steps (a)-(c) until the first array is exhausted.

When transforming each date of interest and each target date to the corresponding integer normalized date, the computing apparatus may be further configured to: convert, by the processor, each date of interest and each target date to a corresponding epoch-formatted date; obtain, by the processor, a minimum epoch-formatted date; and normalize, by the processor, each epoch-formatted date with respect to the minimum epoch-formatted date. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: receive, by a processor, a first list of one or more dates of interest and a second list of one or more target dates; transform, by the processor, each date of interest and each target date to a corresponding integer normalized date; obtain, by the processor, a maximum normalized date; initialize, by the processor, a first array of length equal to 'L', where 'L' is the maximum normalized date incremented by 1; and initialize, by the processor, a second array of length equal to 'L', where 'L' is the maximum normalized date incremented by 1. The non-transitory computer-readable storage medium also includes instructions that when executed by a computer, cause the computer to, in the first array: populate, by the processor, each normalized target date in the first array with a sentinel value; obtain, by the processor, a minimum normalized target date; starting at the minimum normalized target date: populate, by the processor, each entry of the first array with a value of days since a previous target; and retrieve, by the processor, a third array from the first array, the third array including one or more entries indicating days since a pervious target date.

The non-transitory computer-readable storage medium also includes instructions that when executed by a computer, cause the computer to, in the second array: populate, by the processor, each normalized target date in the second array with the sentinel value; obtain, by the processor, a maximum normalized target date; starting at the maximum normalized target date: populate, by the processor, each entry of the second array with a value of days until a next target; and retrieve, by the processor, a fourth array from the second array, the fourth array including one or more entries indicating days until a next target date.

When populating each entry of the first array, the computer may be configured to: set, by the processor, a current value of days since equal to zero; beginning at an index of the first array equal to the minimum normalized target date: set, by the processor, the sentinel value equal to the current value of days since; a) increase, by the processor, the current value of days since by one; b) proceed, by the processor, to a next entry in the first array by increasing the index by one; c) set, by the processor: the next entry equal to the current value of days since, when the entry is a null value; and the next entry equal to zero and the current value of days since equal to zero, where the entry is a sentinel; and iterate, by the processor, steps (a)-(c) until the first array is exhausted.

When populating each entry of the second array, the computer may be configured to: set, by the processor, a current value of days until equal to zero; beginning at an index of the second array equal to the maximum normalized target date: set, by the processor, the sentinel value equal to the current value of days until; set, by the processor, the sentinel value equal to zero; a) increase, by the processor, the current value of days since by one; b) proceed, by the processor, to a next entry in the second array by decreasing the index by one; c) set, by the processor: the next entry equal to the current value of days until, when the entry is a null value; and the next entry equal to the current value of days until and the current value of days until equal to zero, where the entry is a sentinel; and iterate, by the processor, steps (a)-(c) until the first array is exhausted.

When transforming each date of interest and each target date to the corresponding integer normalized date, the computer may be configured to: convert, by the processor, each date of interest and each target date to a corresponding epoch-formatted date, obtain, by the processor, a minimum epoch-formatted date, and normalize, by the processor, each epoch-formatted date with respect to the minimum epoch-formatted date. Other technical features may be readily apparent to one skilled in the art from the following figures, descriptions, and claims.

In one aspect, a computer-implemented method for constructing a data structure for use in engineering features is provided, the method includes: receiving, by a processor, a first list of one or more dates of interest and a second list of one or more target dates. The computer-implemented method also includes transforming, by the processor, each date of interest and each target date to a corresponding integer normalized date. The computer-implemented method also includes obtaining, by the processor, a maximum normalized date. The computer-implemented method also includes initializing, by the processor, a first array of length equal to 'L', where 'L' is the maximum normalized date incremented by 1. The computer-implemented method also includes initializing, by the processor, a second array of length equal to 'L', where 'L' is the maximum normalized date incremented by 1. The computer-implemented method also includes, in the first array: populating, by the processor, each normalized target date in the first array with a sentinel value; obtaining, by the processor, a minimum normalized target date; starting at the minimum normalized target date: populating, by the processor, each entry of the first array with a value of days since a previous target; and retrieving, by the processor, a third array from the first array, the third array including one or more entries indicating days since a previous target date. The computer-implemented method also includes, in the second array: populating, by the processor, each normalized target date in the second array with the sentinel value; obtaining, by the processor, a maximum normalized target date; starting at the maximum normalized target date: populating, by the processor, each entry of the second array with a value of days until a next target; and retrieving, by the processor, a fourth array from the second array, the fourth array including one or more entries indicating days until a next target date.

When populating each entry of the second array, computer-implemented method may also include: setting, by the processor, a current value of days until equal to zero; beginning at an index of the first array equal to the minimum normalized target date: setting, by the processor, the sentinel value equal to the current value of days since; a) increasing, by the processor, the current value of days since by one; b) proceeding, by the processor, to a next entry in the first array by increasing the index by one; c) setting, by the processor: the next entry equal to the current value of days since, when the entry is a null value; and the next entry equal to zero and the current value of days since equal to zero, where the entry is a sentinel; and iterating, by the processor, steps (a)-(c) until the first array is exhausted.

When populating each entry of the second array, the computer-implemented method may also include: setting, by the processor, a current value of days until equal to zero; beginning at an index of the second array equal to the maximum normalized target date: setting, by the processor, the sentinel value equal to the current value of days until; setting, by the processor, the sentinel value equal to zero; a) increasing, by the processor, the current value of days since by one; b) proceeding, by the processor, to a next entry in the second array by decreasing the index by one; c) setting, by the processor: the next entry equal to the current value of days until, when the entry is a null value; and the next entry equal to the current value of days until and the current value of days until equal to zero, where the entry is a sentinel; and iterating, by the processor, steps (a)-(c) until the first array is exhausted.

When transforming each date of interest and each target date to the corresponding integer normalized date, the computer-implemented method may also include: converting, by the processor, each date of interest and each target date to a corresponding epoch-formatted date; obtaining, by the processor, a minimum epoch-formatted date; and normalizing, by the processor, each epoch-formatted date with respect to the minimum epoch-formatted date. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter may become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

Figure 1:
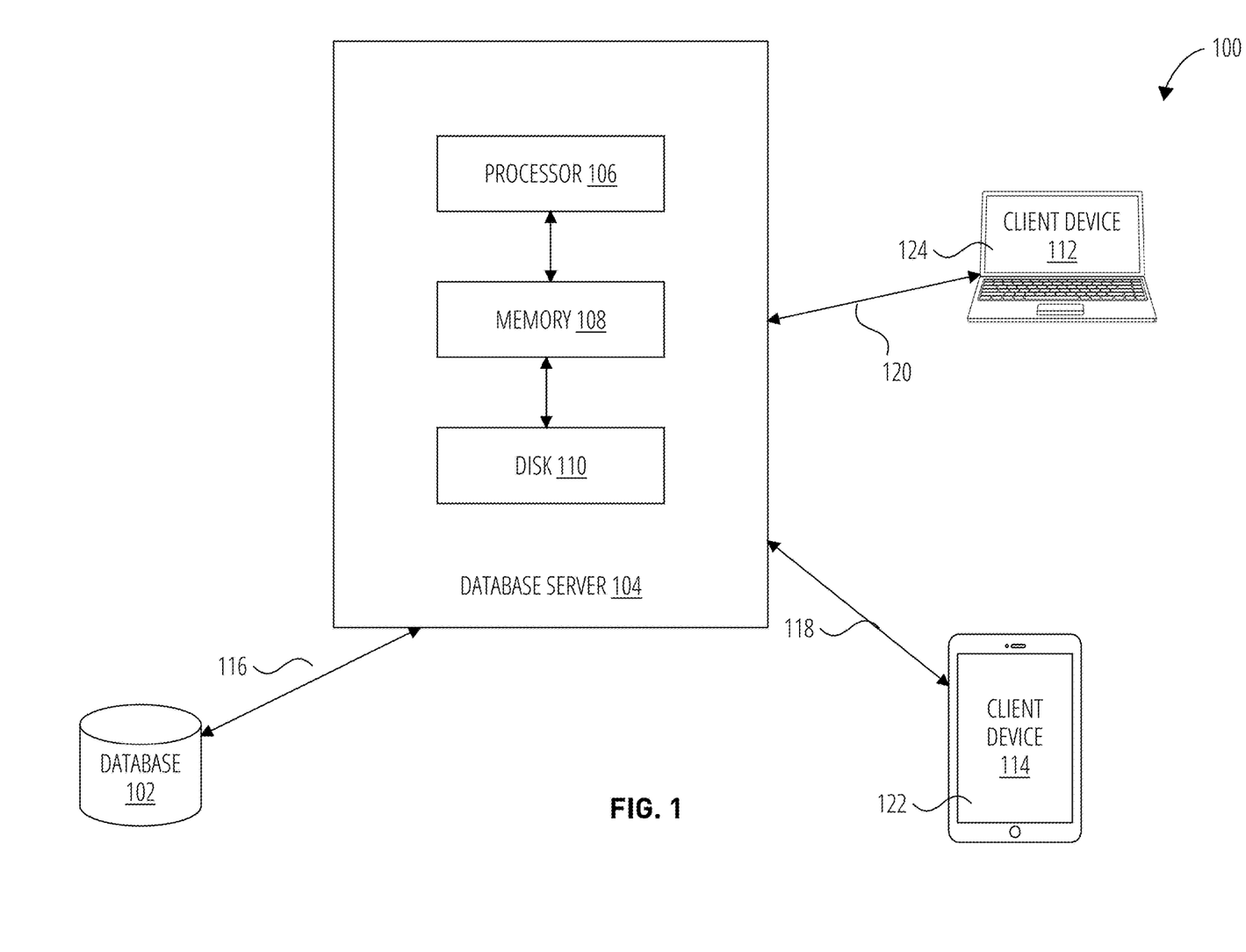
FIG. 1 illustrates an example of a system for determining date proximity in features engineering in accordance with one embodiment.

FIG. 1 illustrates an example of a system 100 for determining date proximity in features engineering in one embodiment.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Disclosed herein are systems and methods for determination of date proximity, in which each date of interest (in a dataset) may be converted to epoch format. Similarly, each target date (in the dataset) can also be converted to epoch format. The minimum epoch value of the full set of epoch date of interest and epoch target date, can then be calculated. The epoch format of each date of interest, each target date, and the maximum epoch value may each be normalized by subtracting the minimum epoch value from each. Similarly, the maximum epoch value of the full set of epoch date of interest and epoch target date, can be calculated. For case of further explanation of the systems and methods, the normalized maximum epoch value can be designated as 'N'.

Subsequently, two empty integer arrays (or data structures), each with a dimension of 1×(N+1), can be allocated. For each value of the target date, each array may be populated with a sentinel value of maximum+1. One array can be used for the determination of days until a target date, while the other array can be used for the determination of days since a previous target date.

Construction of an array to determine the number of days since a target can be achieved as follows. Select one of the two arrays that have been allocated. Starting with the maximum target date value as the index, replace the sentinel with 0. Decrease the index by 1: if this value is a sentinel, then populate the value with 0; if this value is not a sentinel, then populate this value with the previous value incremented by 1. This can be repeated until the index reaches 0.

Construction of an array to determine the number of days until a target can be achieved as follows. Select the other array. Starting with the minimum target date value as the index, replace the sentinel with 0. Increase the index by 1: if this value is a sentinel, then populate it with 0; if this value is not a sentinel, then populate this value with the previous value incremented by 1. Repeat until the index reaches the maximum value.

The two populated arrays can now be used to replace the normalized epoch dates of interest with the individual days until, and since, the next target.

Figure 2:
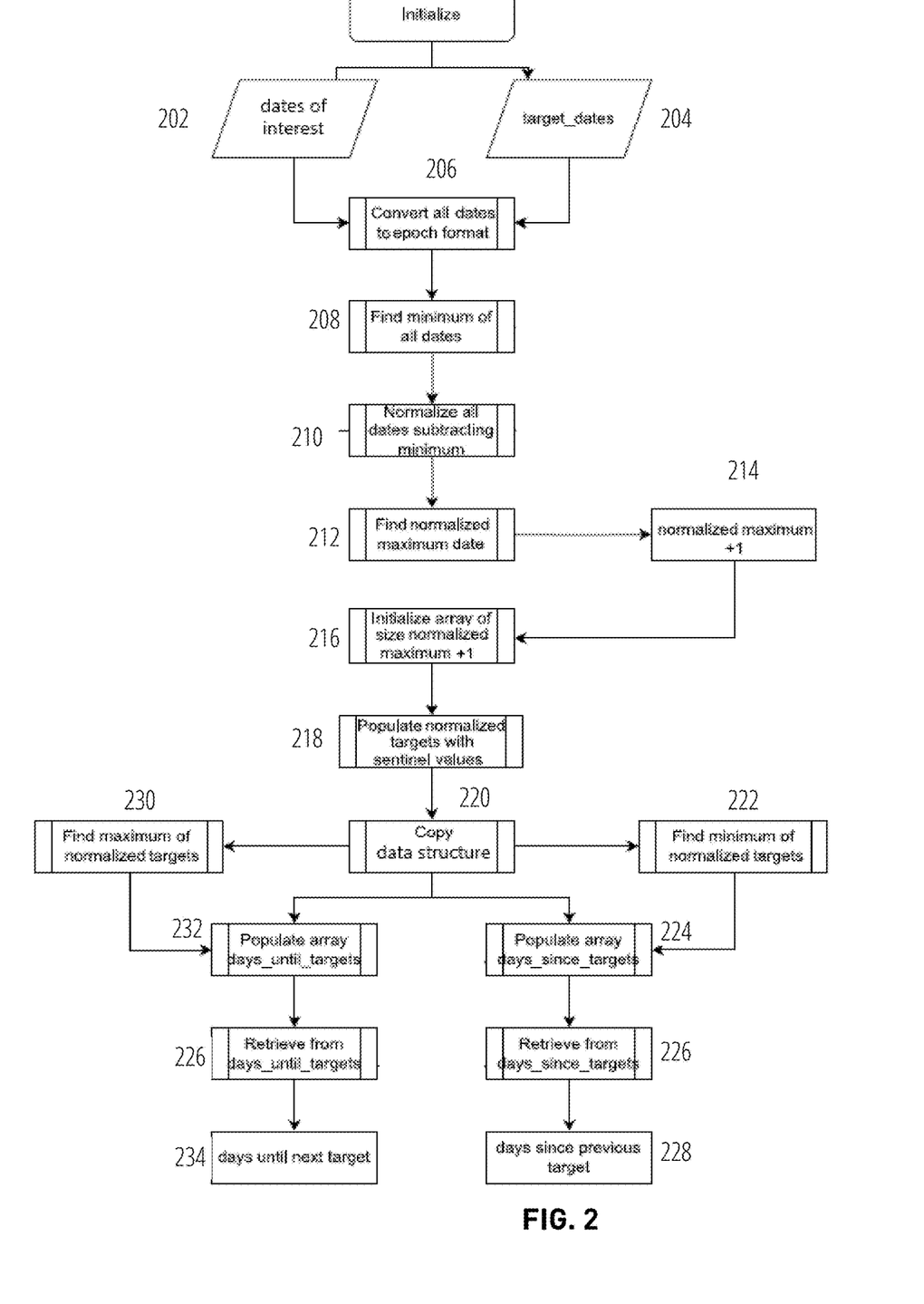
FIG. 2 illustrates a block diagram in accordance with one embodiment.

FIG. 2 illustrates a block diagram 200 in accordance with one embodiment.

A list of dates of interest 202 and a list of target dates 204 are received. Each date is converted to an epoch format at block 206. From the epoch format obtained at 206, a minimum epoch format date is obtained at block 208. Each of the epoch format dates is then normalized at block 210 by subtracting the minimum epoch format date found at block 208. At this juncture, there are two sets of normalized dates: one set of normalized target dates, and one set of normalized dates of interests. Each set will be used in one or more subroutines that follows.

Subsequently, the normalized maximum date is found at block 212, which is incremented by +1, at 214. As an example, the normalized maximum date can be designated as 'N', and a one-dimensional array of the size obtained at block 214 (that is, 'N+1'), is initialized at block 216. The structure of the array is as follows: the minimum index is '0', while the maximum index is 'N'. Each index corresponds to a normalized epoch date, which in turn corresponds to a date (which is either a date of interest, or a target date). The value at each index, will reflect a feature of the corresponding date. The array has a size of 'N+1'.

Figure 3:
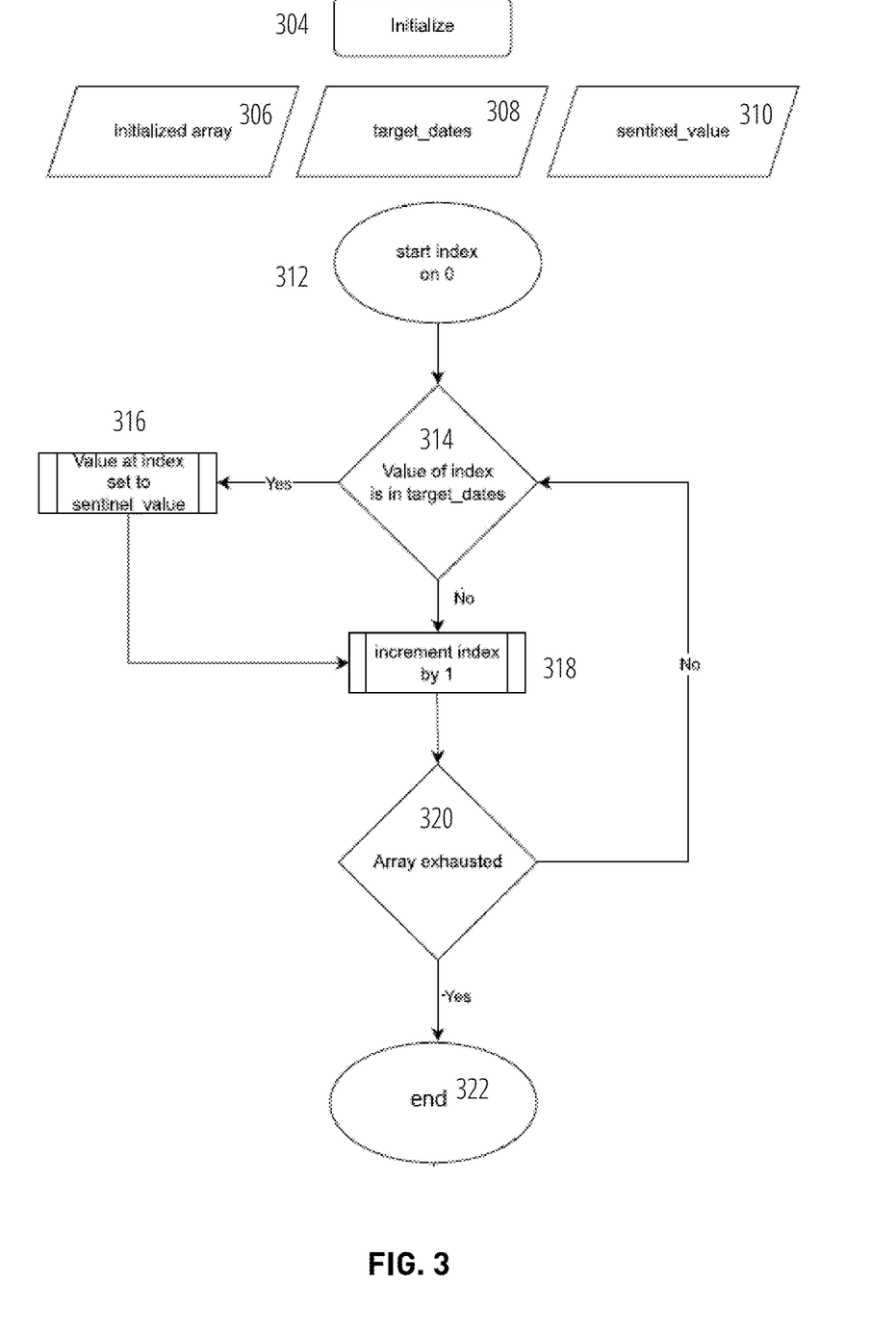
FIG. 3 illustrates a block diagram in accordance with one embodiment.

This initialized array is populated at the position of each of the normalized epoch target dates with a sentinel value, using subroutine 218 (which is further described in FIG. 3). That is, the set of normalized target dates (obtained at block 206) is used to populate the array with a sentinel value at each normalized target date.

The base array, obtained by subroutine 218, is copied at block 220. One copy will be used to obtain a list of days since a previous target date (at block 228). A second copy will be used to obtain a list of days until a next target date (at block 234).

In order to obtain a list of days since a previous target, a minimum of the normalized targets is obtained at block 222. The set of normalized target dates (obtained at block 210) is used in block 222.

Figure 4:
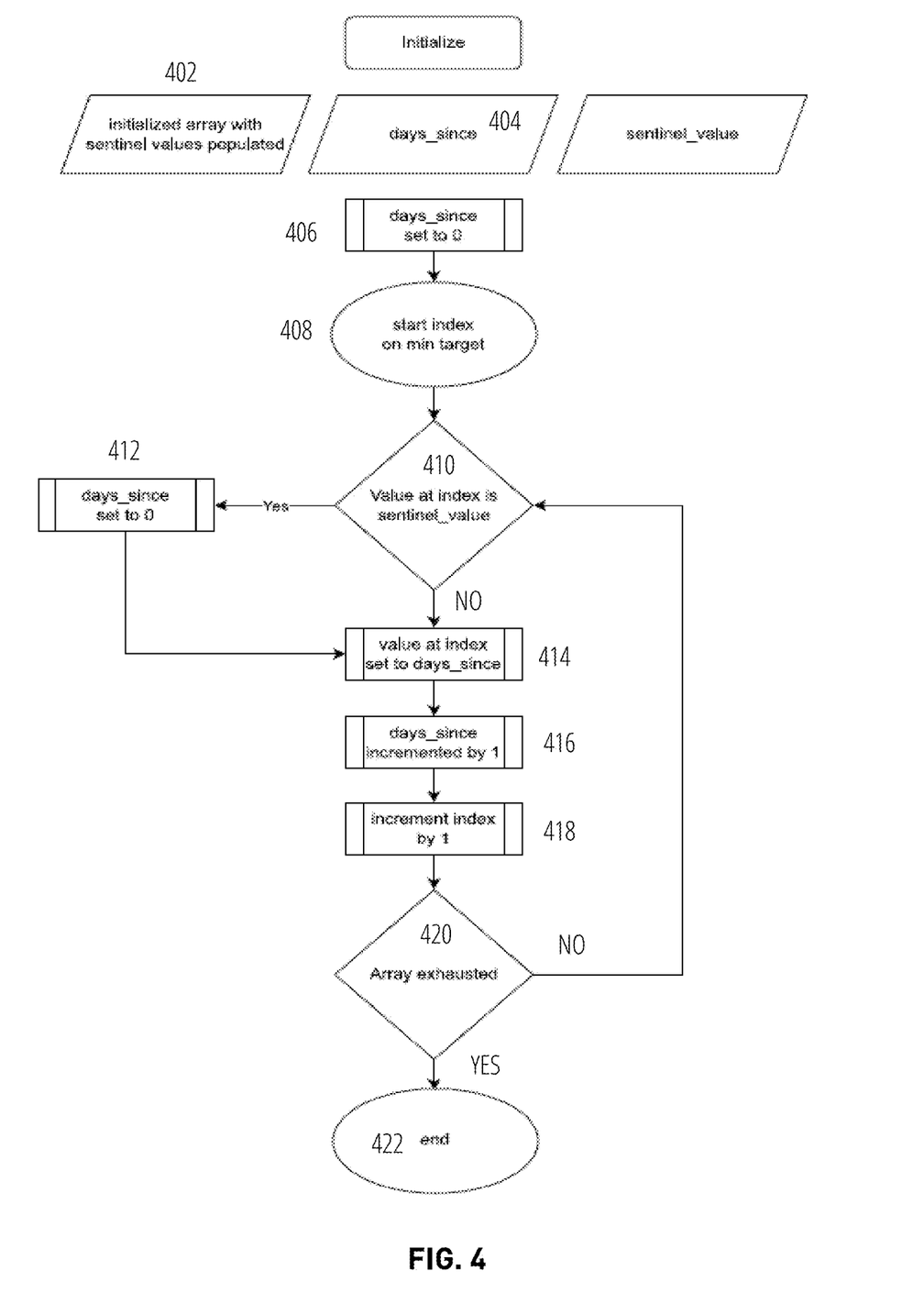
FIG. 4 illustrates a block diagram in accordance with one embodiment.

From this minimum, the array is populated with the requisite days since a previous target at subroutine 224 (which is further described in FIG. 4). Here, the set of normalized dates of interest (obtained at block 210) is used in subroutine 224.

The array obtained from subroutine 224 can then be used as a lookup to retrieve information about days since a previous target at subroutine 226, which then results in the list of days since a previous target at 228. Here, the set of normalized dates of interest (obtained at block 210) is used in subroutine 226 (which is further described in FIG. 6).

In order to obtain a list of days until a next target, a maximum of the normalized targets is obtained at block 230. The set of normalized target dates (obtained at block 210) is used in block 230.

Figure 5:
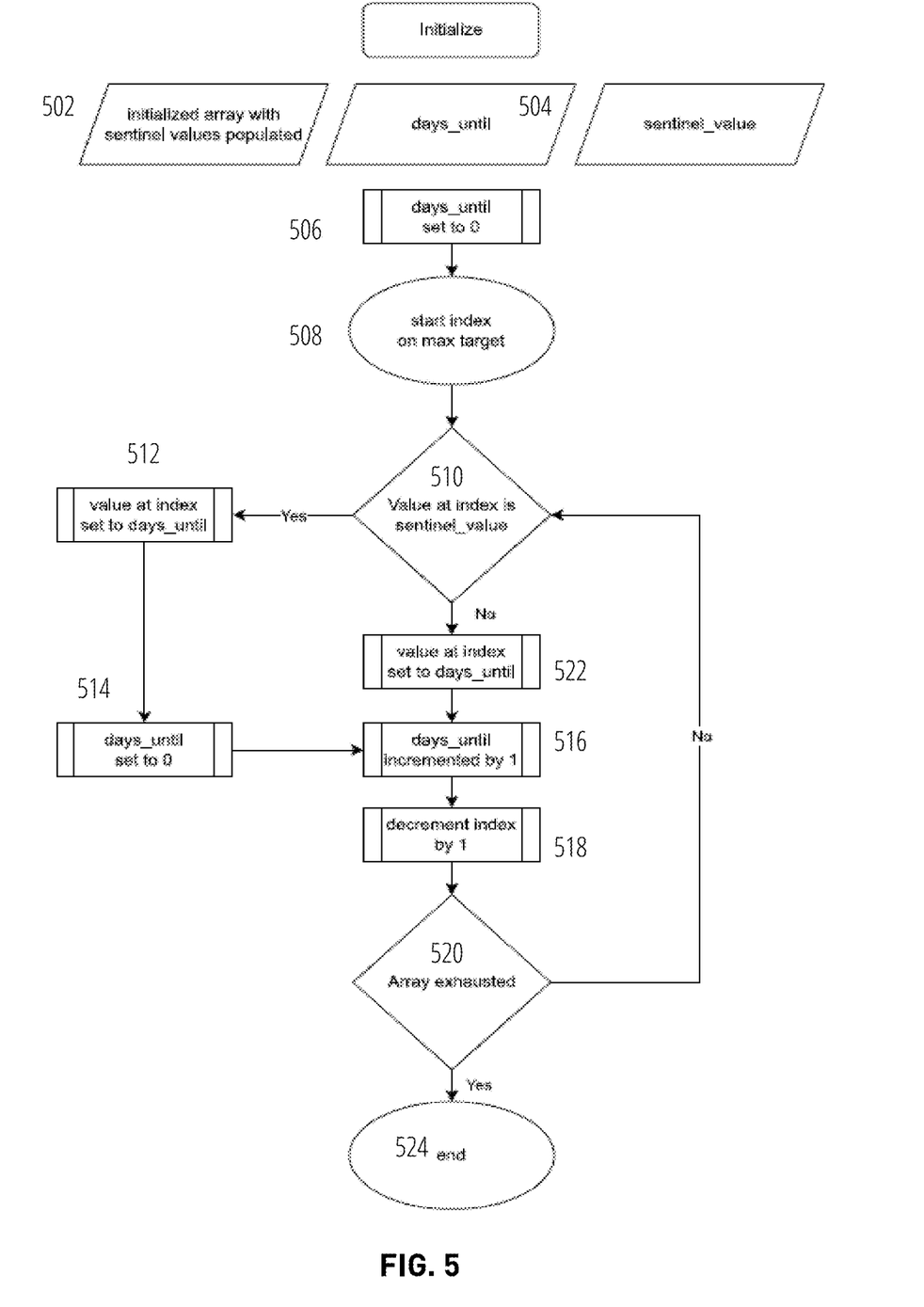
FIG. 5 illustrates a block diagram in accordance with one embodiment.

From this maximum, the array is populated with the requisite days until a next target at subroutine 232 (which is further described in FIG. 5). Here, the set of normalized dates of interest (obtained at block 210) is used in subroutine 232.

The array obtained from subroutine 232 can then be used as a lookup to retrieve information about days until a next target at subroutine 226, which then results in the list of days until a next target at block 234. Here, the set of normalized dates of interest (obtained at block 210) is used in subroutine 226 (which is further described in FIG. 6).

FIG. 3 illustrates a block diagram in accordance with one embodiment. In FIG. 3, a subroutine is presented in which normalized targets are each populated with a sentinel value.

An initialized array 306 can be obtained, for example, at block 216 in FIG. 2. As discussed, the minimum index of the initialized array 306 is '0', while its maximum index is 'N'. Each index corresponds to a normalized epoch date, which in turn corresponds to a date (which is either a date of interest, or a target date). That is, in the list of normalized target dates 308, each normalized target date is a unique index in the initialized array 306.

Populating the initialized array 306 with a sentinel value 310 can begin at the lowest index (index='0') at 312. At decision block 314, the system checks to see if the current value of the index matches an index value of a target date.

If yes, then the array value at the index is set to the sentinel value 310 at block 316. Subsequently, the system proceeds to the next index by increasing the index by +1 at block 318, and checks to see if the array has been exhausted at decision block 320. If not, then the system once again checks to see if the current value of the index matches an index value of a target date at decision block 314.

If the current index does not match an index value of one of the target dates ('no' at decision block 314), then the system proceeds to the next index by increasing the index by +1 at block 318, and checks to see if the array has been exhausted at decision block 320. If not, then the system once again checks to see if the current value of the index matches an index value of a target date at decision block 314.

Once the array is exhausted ('yes' at 320), the process of populating the indices that correspond to the target dates, comes to an end at 322. The result is an array in which, a sentinel value populates each index position that corresponds to a target date.

FIG. 4 illustrates a block diagram in accordance with one embodiment. In FIG. 4, a subroutine is presented by which a data structure is produced which contains information about the number of days since a previous target date.

Inputs can include an initialized array with sentinel values that populate the target indices (item 402) and an integer value of days since a previous target date (item 404). Item 402, the populated initialized array, can be obtained from the output of the subroutine illustrated in FIG. 3. The "days since" value is initially set to '0' at 406 by the system. A pointer is then set to the index which corresponds to the minimum target index, which is where the process begins (408).

The value at the current index is checked to see if it corresponds to a sentinel value at decision block 410. If yes (which is the case at the starting index), then the "days since" value is set to '0' at block 412. The value at the current index is then set to the value of "days since" at block 414. In the case of the first index, which starts at the minimum target date, the sentinel value is changed to the "days since" value, which is '0', as directed at block 414.

The "days since" value is incremented by +1, at block 418. Continuing with the first-case scenario, the "days since" is now "1". The system moves to the next index, by incrementing the index by 1, at block 418. The system checks to see if the array is exhausted at decision block 420. If not, then the remaining indices are iterated, such that sentinel values are replaced by '0', and values at successive indices are increased by 1, to obtain the number of days since a previous target date. The process ends at 422.

FIG. 5 illustrates a block diagram in accordance with one embodiment. In FIG. 5, a subroutine is presented by which a data structure is produced which contains information about the number of days until a next target date.

Inputs can include an initialized array with sentinel values that populate the target indices (item 502) and an integer value of days until a next target date (item 504). Item 502, the populated initialized array, can be obtained from the output of the subroutine illustrated in FIG. 3. The "days until" value is initially set to '0' at block 508 by the system. A pointer is then set to the index which corresponds to the maximum target index, which is where the process begins (508).

The value at the current index is checked to see if it corresponds to a sentinel value at decision block 510. If yes then the value at the current index is set to the current "days until" value at block 512. Subsequently, the "day until" value is set to '0' at block 514. The "days until" value is incremented by +1, at block 516. The system moves to the next lower index, by decreasing the index by 1, at block 518. The system checks to see if the array is exhausted at decision block 520. If not, then the system returns to decision block 510 to check if the value at the index is a sentinel value.

If the answer is 'no' at decision block 510, then the value at the index is set to the current value of "days until" at block 522. The value of "days until" is increased by '1' at block 516. The system moves to the next lower index, by decreasing the index by 1, at block 518. The system checks to see if the array is exhausted at decision block 520. If not, then the remaining indices are iterated, such that sentinel values are replaced by '0', and values at successive indices are increased by 1, to obtain the number of days since a previous target date. The process ends at 524.

Figure 6:
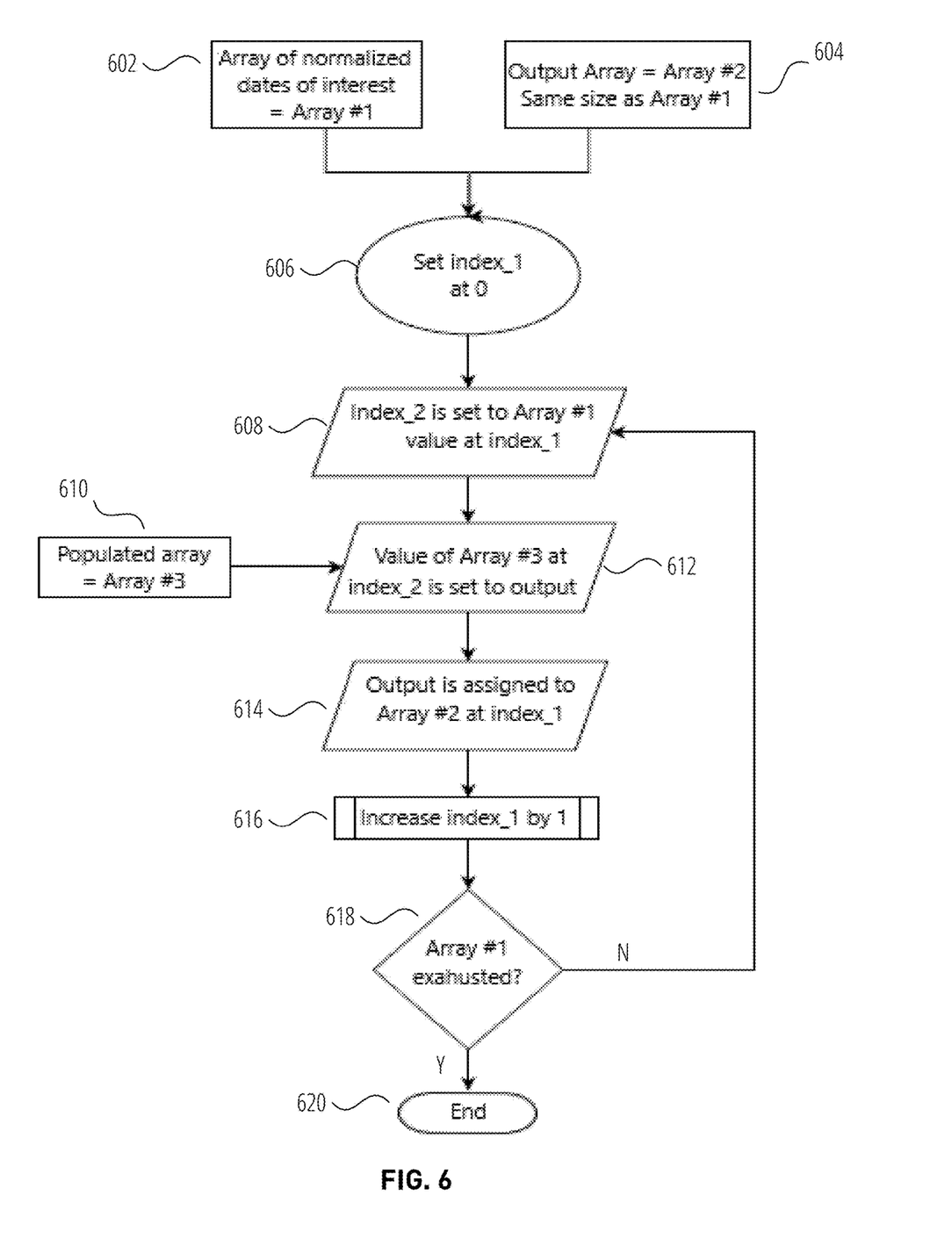
FIG. 6 illustrates a block diagram in accordance with one embodiment.

FIG. 6 illustrates a block diagram in accordance with one embodiment. In FIG. 5, a subroutine is presented to retrieve data from any one of the arrays that include days since a target (obtained from subroutine 224 as shown in FIG. 4), or days until a target (obtained from subroutine 232 as shown in FIG. 5).

In FIG. 6, two arrays are used at the start: an array of normalized dates of interest (Array #1) shown in 602, and an output array (Array #2) shown in 604. Array #1 is a one-dimensional array, having a size equal to the total number of dates of interest. Array #2 has the same size as Array #1. The retrieval of data from Array #1 will be output in Array #2.

At 606, a first index (index_1) is initialized to the value 0. Next, at 608, a second index (index_2) is set to the value of Array #1 at the current value of index_1.

Array #3, at 610, is a populated array obtained from either subroutine 224 (in FIG. 2) or subroutine 232 (in FIG. 2). Array #3 is used at 612 as follows. The value of Array #3 corresponding to the current value of index_2 is set to output.

Next, at 614, the output obtained (at 612), is assigned to the output array (Array #2) at the current value of index_1. Index_1 is then increased by 1 at 616. If Array #1 is not exhausted ('no' at decision block 618), the process is repeated at 608, until Array #1 is exhausted ('yes' at decision block 618) at which point the process ends at 620.

The result is a fully-filled Array #2. If the retrieved data is for days since a target date, Array #2 is designated as follows: each index of the array (beginning at '0') corresponds to a unique date of interest; the value at the index is the number of days since a closest target date.

If the retrieved data is for days until a target date, Array #2 is designated as follows: each index of the array (beginning at '0') corresponds to a unique date of interest; the value at the index is the number of days until a next target date.

Figure 7:
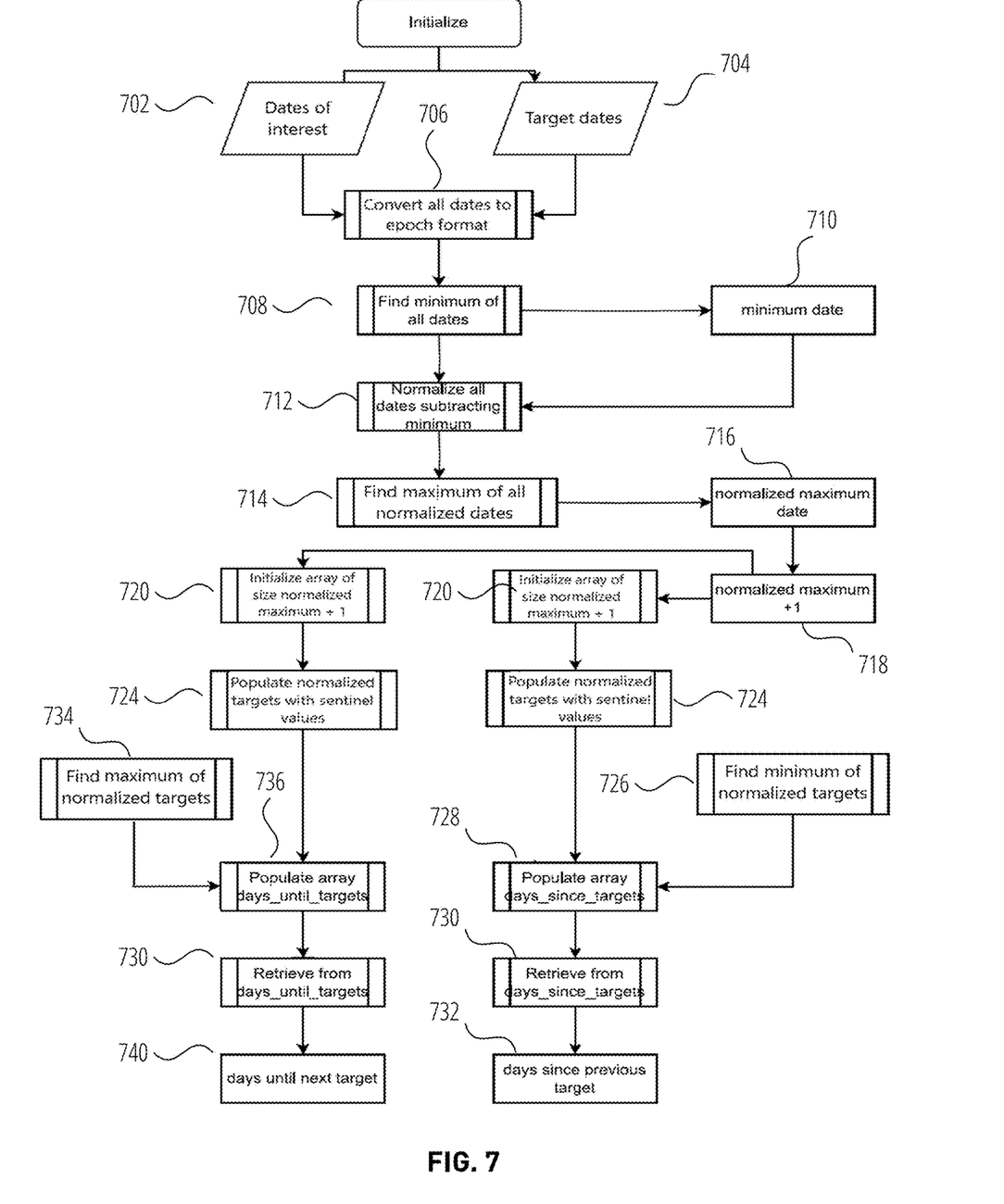
FIG. 7 illustrates a block diagram in accordance with one embodiment.

FIG. 7 illustrates a block diagram 700 in accordance with one embodiment.

A list of dates of interest 702 and a list of target dates 704 are received. Each date is converted to an epoch format at 706. From the epoch format obtained at 706, a minimum epoch format date, 710 is obtained from subroutine 708. Each of the epoch format dates is then normalized at subroutine 712 by subtracting the minimum epoch format date 710. At this juncture, there are two sets of normalized dates: one set of normalized target dates, and one set of normalized dates of interests. Each set will be used in one or more subroutines that follows.

Subsequently, the normalized maximum date 716 is obtained from subroutine 714, which is incremented by +1, at 718. As an example, the normalized maximum date can be designated as 'N'. A one-dimensional array of size 'N+1', is initialized at subroutine 720. At this point, a second one-dimensional array of size 'N+1', is also initialized using subroutine 720. There are now two one-dimensional arrays, each of size 'N+1', which have been initialized, and are waiting to be populated. This is different from the block diagram shown in FIG. 2, in which one one-dimensional array (of size 'N+1") is initialized, populated with sentinel dates, and then duplicated.

The structure of each one-dimensional array is as follows: the minimum index is '0', while the maximum index is 'N'. Each index corresponds to a normalized epoch date, which in turn corresponds to a date (which is either a date of interest, or a target date). The value at each index, will reflect a feature of the corresponding date.

Each initialized array is populated at the position of each of the normalized epoch target dates with a sentinel value, using 724 (which is further described in FIG. 3). That is, the set of normalized target dates (obtained at subroutine 712) is used to populate the array with a sentinel value at each normalized target date.

Unlike the block diagram in FIG. 2 in which a base array is initialized, populated with sentinel values, and then copied, here, two one-dimensional array (each of size 'N+1') are each initialized and populated with sentinel values. One array is used to obtain a list of days since a previous target date (using subroutine 728). The other arrays is used to obtain a list of days until a next target date (using subroutine 736).

In order to obtain a list of days since a previous target, a minimum of the normalized targets is obtained at subroutine 726. The set of normalized target dates (obtained at subroutine 712) is used in subroutine 726.

From this minimum, the array is populated with the requisite days since a previous target at subroutine 728 (which is further described in FIG. 4). Here, the set of normalized dates of interest (obtained at subroutine 712) is used in subroutine 728.

The array obtained from subroutine 728 can then be used as a lookup to retrieve information about days since a previous target at subroutine 730, which then results in the list of days since a previous target at 732. Here, the set of normalized dates of interest (obtained at subroutine 712) is used in subroutine 730 (which is further described in FIG. 6).

In order to obtain a list of days until a next target, a maximum of the normalized targets is obtained at subroutine 734. The set of normalized target dates (obtained at subroutine 712) is used by subroutine 714.

From this maximum, the array is populated with the requisite days until a next target at subroutine 736 (which is further described in FIG. 5). Here, the set of normalized dates of interest (obtained at subroutine 712) is used by subroutine 736.

The array obtained from subroutine 736 can then be used as a lookup to retrieve information about days until a next target by subroutine 730 which then results in the list of days until a next target at 740. Here, the set of normalized dates of interest (obtained by subroutine 712) is used by subroutine 730 (which is further described in FIG. 6).

Example

Consider the following list of dates from Dec. 23, 20219 to Jan. 3, 2020: one column lists dates of interest; the other lists target dates. The target dates include the holidays of Dec. 25, 2019 and Jan. 1, 2019, along with Boxing Day (an important shopping date) on Dec. 26, 20219.

TABLE 1

| LIST OF DATES | |
| --- | --- |
| Date of Interest | Target dates |
| Dec. 23, 2019 | Dec. 25, 2019 (Christmas Day) |
| Dec. 24, 2019 | Dec. 26, 2019 (Boxing Day) |
| Dec. 27, 2019 | Jan. 1, 2020 (New Year's Day) |
| Dec. 28, 2019 | |
| Dec. 29, 2019 | |
| Dec. 30, 2019 | |
| Dec. 31, 2019 | |
| Jan. 2, 2020 | |
| Jan. 3, 2020 | |

Each date is converted to its corresponding day integer offset since the epoch date. This is obtained from the corresponding epoch date, divided by the number of seconds in a 24-hour day. The normalized day of each date is obtained by subtracting the smallest day integer (18253 in Table 2 below) from the corresponding day integer. This normalized day is defined as the index of the date. Each index thus corresponds to a date; the index of each target date is populated with a sentinel value, which in Table 2, is set to −1. Note that another sentinel value can be chosen.

TABLE 2

LIST OF DATES, CORRESPONDING INDEX, SENTINEL VALUE

| Date Type | Date | Day integer offset since epoch = epoch value | Normalized day = Index | Sentinel value |
|---|---|---|---|---|
|  | Dec. 23, 2019 | 18253 | 18253 − 18253 = 0 | N/A |
|  | Dec. 24, 2019 | 18254 | 18254 − 18253 = 1 | N/A |
| Target | Dec. 25, 2019 | 18255 | 2 | −1 |
| Target | Dec. 26, 2019 | 18256 | 3 | −1 |
|  | Dec. 27, 2019 | 18257 | 4 | N/A |
|  | Dec. 28, 2019 | 18258 | 5 | N/A |
|  | Dec. 29, 2019 | 18259 | 6 | N/A |
|  | Dec. 30, 2019 | 18260 | 7 | N/A |
|  | Dec. 31, 2019 | 18261 | 8 | N/A |
| Target | Jan. 1, 2020 | 18262 | 9 | −1 |
|  | Jan. 2, 2020 | 18263 | 10 | N/A |
|  | Jan. 3, 2020 | 18264 | aa | N/A |

A pair of integer arrays can be constructed from the above. Each array will have a size of 1×12 (or 12×1). At this stage, there are two ways to construct each array.

In one approach, one array is generated such that each target day index is populated with a sentinel value of −1:

$$[\phi, \phi, -1, -1, \phi, \phi, \phi, \phi, \phi, -1, \phi, \phi]$$ (Data Structure 1)

where '$\phi$' denotes a null value. The second array can be constructed by making a copy of Data Structure 1.

In a second approach, two arrays are each generated, such that each target day index is populated with a sentinel value of −1 That is, two identical structures are generated. Each data structure has the form of Data Structure 1.

There is a difference in computer performance between the two approaches. Computer performance of copying an array versus setting the array again from scratch, depends on the actual size of the array. That is, in some instances, it is faster to make a duplicate copy of the array; whereas in other instances, it is faster to construct a second array from scratch.

The index and corresponding value of Data Structure 1 is as follows:

TABLE 3

DATA STRUCTURE 1

| Index | Value |
|---|---|
| 0 | $\phi$ |
| 1 | $\phi$ |
| 2 | −1 |
| 3 | −1 |
| 4 | $\phi$ |

TABLE 3-continued

DATA STRUCTURE 1

| Index | Value |
|---|---|
| 5 | $\phi$ |
| 6 | $\phi$ |
| 7 | $\phi$ |
| 8 | $\phi$ |
| 9 | −1 |
| 10 | $\phi$ |
| 11 | $\phi$ |

An array that can be used to lookup the number days since a target date, can be constructed from Data Structure 1 as follows. The minimum index with a sentinel value is selected, and the sentinel value is then set to zero. The index is incremented by +1. If the corresponding value is a sentinel value, then the corresponding value is set to zero; otherwise the corresponding value is incremented by +1 from the previous value. This is repeated for each index, until the final index is reached.

In the above example, the minimum index having a sentinel value is minimum_index=2. The corresponding value at index=2, is then set to '0'. The index is then incremented by +1, so now the index=3, for which the value is a sentinel value, which is then set to '0'. The index is then incremented by +1, so now the index=4, for which the value is '$\phi$', which is then set to '0' (the value at the previous index)+1='1'. The index is then incremented by +1, so now the index=5, for which the value is '$\phi$', which is then set to '1' (the value at the previous index)+1='2'. The index is then incremented by +1, so now the index=6, for which the value is '$\phi$', which is then set to '2' (the value at the previous index)+1='3'. The index is then incremented by +1, so now the index=7, for which the value is '$\phi$', which is then set to '3' (the value at the previous index)+1='4'. The index is then incremented by +1, so now the index=8, for which the value is '$\phi$', which is then set to '4' (the value at the previous index)+1='5'. The index is then incremented by +1, so now the index=9, for which the value is a sentinel value, which is then set to '0'. The index is then incremented by +1, so now the index=10, for which the value is '$\phi$', which is then set to '0' (the value at the previous index)+1='1'. The index is then incremented by +1, so now the index=11, for which the value is '$\phi$', which is then set to '1' (the value at the previous index)+1='2'. The final data structure for days since the last target, called Data Structure 2, is as follows:

(Data Structure 2: days since last target)

$$[\phi, \phi, 0, 0, 1, 2, 3, 4, 5, 0, 1, 2]$$

Similarly, an array that can be used to look up the number days until a target date, can be constructed from Data Structure 1 as follows. The maximum index with a sentinel value is selected, and the corresponding sentinel value is then set to zero. The index is decreased by 1. If the corresponding value is a sentinel value, then the corresponding value is set to zero; otherwise the corresponding value is incremented by +1 from the value of the previous index. This is repeated for each index, until the smallest index is reached.

In the above example, the maximum index having a sentinel value is maximum_index=9. The corresponding value at index=9, is then set to '0'. The index is then decreased by 1-so now the index=8, for which the value is 'ϕ', which is then set to '0' (the value at the previous index)+1='1'. The index is then decreased by 1, so now the index=7, for which the value is 'ϕ', which is then set to '1' (the value at the previous index)+1='2'. The index is then decreased by 1, so now the index=6, for which the value is 'ϕ', which is then set to '2' (the value at the previous index)+1='3'. The index is then decreased by 1, so now the index=5, for which the value is 'ϕ', which is then set to '3' (the value at the previous index)+1= '4'. The index is then decreased by 1, so now the index=4, for which the value is 'ϕ', which is then set to '4' (the value at the previous index)+1='5'. The index is then decreased by 1, so now the index=3, for which the value is a sentinel value, which is then set to '0'. The index is then decreased by 1, so now the index=2, for which the value is a sentinel value, which is then set to '0'. The index is then decreased by 1, so now the index=1, for which the value is '?', which is then set to '0' (the value at the previous index)+1='1'. The index is then decreased by 1, so now the index=0, for which the value is 'ϕ', which is then set to '1' (the previous index value)+1='2'. The final data structure for days until the last target, called Data Structure 3, is as follows:

(Data Structure 3: days until last target)

[2, 1, 0, 0, 5, 4, 3, 2, 1, 0, ϕ, ϕ]

There can be other ways to construct a data structure from Data Structure 1, that provides a lookup for days since a previous target, and/or, days until a next target. For example, applying the block diagram in FIG. 5 to Data Structure 1, yields the following array for days until next target:

(Data Structure 4: days until last target)

[3, 2, 1, 6, 5, 4, 3, 2, 1, 0, ϕ, ϕ]

In general, the data structure that provides the number of days until a target date, and the data structure that provides the number of days since a target date, can each be used as a lookup. For example, for a date of interest, to find the number of days since a target date, the date of interest can be cast as its corresponding value, and then a corresponding index, which is then used to lookup the corresponding value in the data structure that represents the number of days since a target date.

Similarly, for a date of interest, to find the number of days until a target date, the date of interest can be cast as its corresponding value, and then a corresponding index, which is then used to lookup the corresponding value in the data structure that represents the number of days until a target date.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computing apparatus comprising:
   a processor; and
   a memory storing instructions that, when executed by the processor, configure the apparatus to:
   receive, by the processor, a first list of one or more dates of interest and a second list of one or more target dates;
   transform, by the processor, each date of interest and each target date to a corresponding integer normalized date;
   obtain, by the processor, a maximum normalized date;
   initialize, by the processor, a first array of length equal to 'L', where 'L' is the maximum normalized date incremented by 1;
   initialize, by the processor, a second array of length equal to 'L';
   in the first array:
      populate, by the processor, each normalized target date in the first array with a sentinel value;
      obtain, by the processor, a minimum normalized target date;
      starting at the minimum normalized target date:
         populate, by the processor, each entry of the first array with a value of days since a previous target; and
      retrieve, by the processor, a third array from the first array, the third array comprising one or more entries indicating days since a previous target date; and
   in the second array:
      populate, by the processor, each normalized target date in the second array with the sentinel value;
      obtain, by the processor, a maximum normalized target date; and
      starting at the maximum normalized target date:
         populate, by the processor, each entry of the second array with a value of days until a next target; and
      retrieve, by the processor, a fourth array from the second array, the fourth array comprising one or more entries indicating days until a next target date.

2. The computing apparatus of claim 1, wherein when populating each entry of the first array, the apparatus is configured to:
set, by the processor, a current value of days since equal to zero;
beginning at an index of the first array equal to the minimum normalized target date:
set, by the processor, the sentinel value equal to the current value of days since;
a) increase, by the processor, the current value of days since by one;
b) proceed, by the processor, to a next entry in the first array by increasing the index by one;
c) set, by the processor:
the next entry equal to the current value of days since, when the entry is a null value; and
the next entry equal to zero and the current value of days since equal to zero, where the entry is a sentinel;
and
iterate, by the processor, steps (a)-(c) until the first array is exhausted.

3. The computing apparatus of claim 1, wherein when populating each entry of the second array, the apparatus is configured to:
set, by the processor, a current value of days until equal to zero;
beginning at an index of the second array equal to the maximum normalized target date:
set, by the processor, the sentinel value equal to the current value of days until;
set, by the processor, the sentinel value equal to zero;
a) increase, by the processor, the current value of days since by one;
b) proceed, by the processor, to a next entry in the second array by decreasing the index by one;
c) set, by the processor:
the next entry equal to the current value of days until, when the entry is a null value; and
the next entry equal to the current value of days until and the current value of days until equal to zero, where the entry is a sentinel;
and
iterate, by the processor, steps (a)-(c) until the first array is exhausted.

4. The computing apparatus of claim 1, wherein when transforming each date of interest and each target date to the corresponding integer normalized date, the apparatus is further configured to:
convert, by the processor, each date of interest and each target date to a corresponding epoch-formatted date;
obtain, by the processor, a minimum epoch-formatted date; and
normalize, by the processor, each epoch-formatted date with respect to the minimum epoch-formatted date.

5. A non-transitory computer-readable storage medium, the computer-readable storage medium including instructions that when executed by a computer, cause the computer to:
receive, by a processor, a first list of one or more dates of interest and a second list of one or more target dates;
transform, by the processor, each date of interest and each target date to a corresponding integer normalized date;
obtain, by the processor, a maximum normalized date;
initialize, by the processor, a first array of length equal to 'L', where 'L' is the maximum normalized date incremented by 1;
initialize, by the processor, a second array of length equal to 'L';
in the first array:
populate, by the processor, each normalized target date in the first array with a sentinel value;
obtain, by the processor, a minimum normalized target date;
starting at the minimum normalized target date:
populate, by the processor, each entry of the first array with a value of days since a previous target;
and
retrieve, by the processor, a third array from the first array, the third array comprising one or more entries indicating days since a previous target date;
and
in the second array:
populate, by the processor, each normalized target date in the second array with the sentinel value;
obtain, by the processor, a maximum normalized target date; and
starting at the maximum normalized target date:
populate, by the processor, each entry of the second array with a value of days until a next target;
and
retrieve, by the processor, a fourth array from the second array, the fourth array comprising one or more entries indicating days until a next target date.

6. The computer-readable storage medium of claim 5, wherein when populating each entry of the first array, the computer is configured to:
set, by the processor, a current value of days since equal to zero;
beginning at an index of the first array equal to the minimum normalized target date:
set, by the processor, the sentinel value equal to the current value of days since;
a) increase, by the processor, the current value of days since by one;
b) proceed, by the processor, to a next entry in the first array by increasing the index by one;
c) set, by the processor:
the next entry equal to the current value of days since, when the entry is a null value; and
the next entry equal to zero and the current value of days since equal to zero, where the entry is a sentinel;
and
iterate, by the processor, steps (a)-(c) until the first array is exhausted.

7. The computer-readable storage medium of claim 5, wherein when populating each entry of the second array, the computer is configured to:
set, by the processor, a current value of days until equal to zero;
beginning at an index of the second array equal to the maximum normalized target date:
set, by the processor, the sentinel value equal to the current value of days until;
set, by the processor, the sentinel value equal to zero;
a) increase, by the processor, the current value of days since by one;
b) proceed, by the processor, to a next entry in the second array by decreasing the index by one;
c) set, by the processor:
the next entry equal to the current value of days until, when the entry is a null value; and the next entry equal to the current value of days until and the current value of days until equal to zero, where the entry is a sentinel; and iterate, by the processor, steps (a)-(c) until the second array is exhausted.

8. The computer-readable storage medium of claim 5, wherein when transforming each date of interest and each target date to the corresponding integer normalized date, the computer is configured to:

convert, by the processor, each date of interest and each target date to a corresponding epoch-formatted date;

obtain, by the processor, a minimum epoch-formatted date; and normalize, by the processor, each epoch-formatted date with respect to the minimum epoch-formatted date.

9. A computer-implemented method for constructing a data structure for use in engineering features, the method comprising:

receiving, by a processor, a first list of one or more dates of interest and a second list of one or more target dates;

transforming, by the processor, each date of interest and each target date to a corresponding integer normalized date;

obtaining, by the processor, a maximum normalized date;

initializing, by the processor, a first array of length equal to 'L', where 'L' is the maximum normalized date incremented by 1;

initializing, by the processor, a second array of length equal to 'L';

in the first array:
  populating, by the processor, each normalized target date in the first array with a sentinel value;
  obtaining, by the processor, a minimum normalized target date;
  starting at the minimum normalized target date:
    populating, by the processor, each entry of the first array with a value of days since a previous target; and
  retrieving, by the processor, a third array from the first array, the third array comprising one or more entries indicating days since a previous target date;
and
in the second array:
  populating, by the processor, each normalized target date in the second array with the sentinel value;
  obtaining, by the processor, a maximum normalized target date; and
  starting at the maximum normalized target date:
    populating, by the processor, each entry of the second array with a value of days until a next target; and
  retrieving, by the processor, a fourth array from the second array, the fourth array comprising one or more entries indicating days until a next target date.

10. The computer-implemented method of claim 9, wherein populating each entry of the first array comprises:

setting, by the processor, a current value of days since equal to zero;

beginning at an index of the first array equal to the minimum normalized target date:
  setting, by the processor, the sentinel value equal to the current value of days since;
  a) increasing, by the processor, the current value of days since by one;
  b) proceeding, by the processor, to a next entry in the first array by increasing the index by one;
  c) setting, by the processor:
    the next entry equal to the current value of days since, when the entry is a null value; and
    the next entry equal to zero and the current value of days since equal to zero, where the entry is a sentinel;
  and
iterating, by the processor, steps (a)-(c) until the first array is exhausted.

11. The computer-implemented method of claim 9, wherein populating each entry of the second array comprises:

setting, by the processor, a current value of days until equal to zero;

beginning at an index of the second array equal to the maximum normalized target date:
  setting, by the processor, the sentinel value equal to the current value of days until;
  setting, by the processor, the sentinel value equal to zero;
  a) increasing, by the processor, the current value of days since by one;
  b) proceeding, by the processor, to a next entry in the second array by decreasing the index by one;
  c) setting, by the processor:
    the next entry equal to the current value of days until, when the entry is a null value; and
    the next entry equal to the current value of days until and the current value of days until equal to zero, where the entry is a sentinel;
  and
iterating, by the processor, steps (a)-(c) until the second array is exhausted.

12. The computer-implemented method of claim 9, wherein transforming each date of interest and each target date to the corresponding integer normalized date comprises;

converting, by the processor, each date of interest and each target date to a corresponding epoch-formatted date;

obtaining, by the processor, a minimum epoch-formatted date; and normalizing, by the processor, each epoch-formatted date with respect to the minimum epoch-formatted date.

* * * * *